United States Patent [19]

Ovshinsky et al.

[11] Patent Number: 5,567,549
[45] Date of Patent: Oct. 22, 1996

[54] NICKEL METAL HYDRIDE BATTERY CONTAINING A MODIFIED DISORDERED MULTIPHASE NICKEL ALUMINUM BASED POSITIVE ELECTRODE

[75] Inventors: Stanford R. Ovshinsky, Bloomfield Hills; Rosa T. Young, Troy, both of Mich.

[73] Assignee: Ovonic Battery Company, Inc., Troy, Mich.

[21] Appl. No.: 308,764

[22] Filed: Sep. 19, 1994

Related U.S. Application Data

[63] Continuation-in-part of Ser. No. 27,973, Mar. 8, 1993, Pat. No. 5,348,822, which is a continuation-in-part of Ser. No. 975,031, Nov. 12, 1992, Pat. No. 5,344,728.

[51] Int. Cl.$^6$ .............................. H01M 4/32; H01M 4/28
[52] U.S. Cl. .............................................. 429/223; 429/218
[58] Field of Search ...................................... 429/223, 218

[56] References Cited

PUBLICATIONS

*Hawley's Chemical Dictionary*, Sax and Lewis, ed. p. 441 and p. 786, (1987) month unavailable.
Askeland, *The Science and Engineering of Materials*, PWS Publishers, 1984, pp. 182–183. month unavailable.

Fischer and Winsel, "Experimental device for investigations of the Formation process of the Ni(OH)$_2$/NiOOH electrode." J. Power Sources, 36 (1991), 167–74.

Winsel and Fischer, "New apparatus for the measurement of self–discharge of the nickel hydroxide electrode", J. Power Sources, 34 (1991) 331–338.

Kamath, et al. "Stabilized $\alpha$(Ni(OH)$_2$) as Electrode Material for Alkaline Secondary Cells", J. Electrochem. Soc. 141 (11) Nov. 1994, 2956–2959.

*Primary Examiner*—Stephen Kalafut
*Assistant Examiner*—Carol Chaney
*Attorney, Agent, or Firm*—Marc J. Luddy; Marvin S. Siskind; David W. Schumaker

[57] ABSTRACT

A disordered positive electrode for use in an alkaline rechargeable electrochemical cell comprising: a solid solution nickel aluminum hydroxide material having a multiphase structure. This solid solution nickel hydroxide material is a multiphase structure that comprises at least one microcrystalline $\alpha$-phase material. Phase stabilizers and conductivity enhancers can be included to further stabilize the material.

17 Claims, No Drawings

NICKEL METAL HYDRIDE BATTERY CONTAINING A MODIFIED DISORDERED MULTIPHASE NICKEL ALUMINUM BASED POSITIVE ELECTRODE

CONTINUATION INFORMATION

This application is a continuation-in-part of U.S. Pat. No. 5,348,822 (application Ser. No. 08/027,973, filed Mar. 8, 1993) which is a continuation-in-part of U.S. Pat. No. 5,344,782 (application Ser. No. 07/975,031, filed Nov. 12, 1992).

FIELD OF THE INVENTION

The present invention relates generally to a unique nickel hydroxide positive electrode. More specifically, this invention relates to modified nickel positive electrode material in which nickel hydroxide is combined with aluminum in such a way as to produce, in situ, a stabilized α-phase. The result is a disordered multicomponent nickel hydroxide positive electrode material. Such material is capable of transferring more than one electron per nickel atom.

BACKGROUND OF THE INVENTION

In rechargeable alkaline cells, weight and portability are important considerations. It is also advantageous for rechargeable alkaline cells to have long operating lives without the necessity of periodic maintenance. Rechargeable alkaline cells are used in numerous consumer devices such as calculators, portable radios, and cellular phones. They are often configured into a sealed power pack that is designed as an integral part of a specific device. Rechargeable alkaline cells can also be configured as larger cells that can be used, for example, in industrial, aerospace, and electric vehicle applications.

The best rechargeable alkaline cells are ones that can operate as an "install and forget" power source. With the exception of periodic charging, a rechargeable alkaline cell should perform without attention and should not become a limiting factor in the life of the device it powers.

Stanford R. Ovshinsky, by applying his fundamental principles of disorder, pioneered the development of the first commercial nickel metal hydride (NiMH) battery. For more than three decades, virtually every other manufacturer in the world studied the NiMH battery technology, but no commercial battery of this kind existed until after the publication of U.S. Pat. No. 4,623,597 to Ovshinsky and Ovshinsky's related technical papers which disclosed basic and fundamentally new principles of battery material design. NiMH batteries are the only truly "green" battery because they can be completely recycled. NiMH batteries are the only rechargeable battery that can meet society's requirements for an ecological, renewable source of electrochemical energy.

Ni—MH cells utilize a negative electrode that is capable of the reversible electrochemical storage of hydrogen. Ni—MH cells usually employ a positive electrode of nickel hydroxide material. The negative and positive electrodes are spaced apart in the alkaline electrolyte. Upon application of an electrical potential across a Ni—MH cell, the Ni—MH material of the negative electrode is charged by the electrochemical absorption of hydrogen and the electrochemical discharge of a hydroxyl ion, as shown in equation (1):

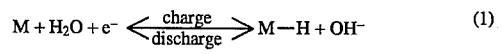

$$M + H_2O + e^- \underset{discharge}{\overset{charge}{\rightleftharpoons}} M-H + OH^- \quad (1)$$

The negative electrode reactions are reversible. Upon discharge, the stored hydrogen is released to form a water molecule and release an electron. The reactions that take place at the nickel hydroxide positive electrode of a Ni—MH cell are shown in equation (2):

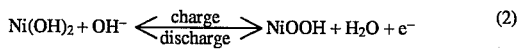

$$Ni(OH)_2 + OH^- \underset{discharge}{\overset{charge}{\rightleftharpoons}} NiOOH + H_2O + e^- \quad (2)$$

Ni—MH materials are discussed in detail in U.S. Pat. No. 5,277,999 Ovshinsky, et al., the contents of which are incorporated by reference.

As previously mentioned, Stanford R. Ovshinsky was responsible for inventing new and fundamentally different electrochemical electrode materials. As predicted by Ovshinsky, detailed investigation by Ovshinsky's team determined that reliance on simple, relatively pure compounds was a major shortcoming of the prior art. Relatively pure crystalline compounds were found to have a low density of hydrogen storage sites, and the type of sites available occurred accidently and were not designed into the bulk of the material. Thus, the efficiency of the storage of hydrogen and the subsequent release of hydrogen to form water was determined to be poor. By applying his fundamental principles of disorder to electrochemical hydrogen storage, Ovshinsky drastically departed from conventional scientific thinking and created a disordered material having an ordered local environment where the entire bulk of the material was provided with catalytically active hydrogen storage sites.

Short-range, or local, order is elaborated on in U.S. Pat. No. 4,520,039 to Ovshinsky, entitled *Compositionally Varied Materials and Method for Synthesizing the Materials*, the contents of which are incorporated by reference. This patent discusses how disordered materials do not require any periodic local order and how, by using Ovshinsky's techniques, spatial and orientational placement of similar or dissimilar atoms or groups of atoms is possible with such increased precision and control of the local configurations that it is possible to produce qualitatively new phenomena. In addition, this patent discusses that the atoms used need not be restricted to "d band" or "f band" atoms, but can be any atom in which the controlled aspects of the interaction with the local environment and/or orbital overlap plays a significant role physically, electronically, or chemically so as to affect physical properties and hence the functions of the materials. Ovshinsky's use of disordered materials has fundamental scientific advantages. The elements of these materials offer a variety of bonding possibilities due to the multidirectionality of d-orbitals. The multidirectionality ("porcupine effect") of d-orbitals provides for a tremendous increase in density and hence active storage sites. These techniques result in means of synthesizing new materials which are disordered in several different senses simultaneously.

Ovshinsky had previously found that the number of surface sites could be significantly increased by making an amorphous film that resembled the surface of the desired relatively pure materials. As Ovshinsky explained in *Principles and Applications of Amorphicity, Structural Change, and Optical Information Encoding*, 42 Journal De Physique at C4-1096 (October 1981):

Amorphicity is a generic term referring to lack of X-ray diffraction evidence of long-range periodicity and is not a sufficient description of a material. To understand amorphous materials, there are several important factors to be considered: the type of chemical bonding, the number of bonds generated by the local order, that is its coordination, and the influence of the entire local environment, both chemical and geometrical, upon the resulting varied configurations. Amorphicity is not determined by random packing of atoms viewed as hard spheres nor is the amorphous solid merely a host with atoms imbedded at random. Amorphous materials should be viewed as being composed of an interactive matrix whose electronic configurations are generated by free energy forces and they can be specifically defined by the chemical nature and coordination of the constituent atoms. Utilizing multi-orbital elements and various preparation techniques, one can outwit the normal relaxations that reflect equilibrium conditions and, due to the three-dimensional freedom of the amorphous state, make entirely new types of amorphous materials—chemically modified materials . . .

Once amorphicity was understood as a means of introducing surface sites in a film, it was possible to produce "disorder" that takes into account the entire spectrum of local order effects such as porosity, topology, crystallites, characteristics of sites, and distances between sites. Thus, rather than searching for material modifications that would yield ordered materials having a maximum number of accidently occuring surface irregularities, Ovshinky's team at ECD began constructing "disordered" materials where the desired irregularities were tailor made. See, U.S. Pat. No. 4,623,597, the disclosure of which is incorporated by reference.

The term "disordered," as used herein corresponds to the meaning of the term as used in the literature, such as the following:

A disordered semiconductor can exist in several structural states. This structural factor constitutes a new variable with which the physical properties of the [material] . . . can be controlled. Furthermore, structural disorder opens up the possibility to prepare in a metastable state new compositions and mixtures that far exceed the limits of thermodynamic equilibrium. Hence, we note the following as a further distinguishing feature. In many disordered [materials] . . . it is possible to control the short-range order parameter and thereby achieve drastic changes in the physical properties of these materials, including forcing new coordination numbers for elements . . .

S. R. Ovshinsky, *The Shape of Disorder*, 32 *Journal of Non-Crystalline Solids* at 22 (1979) (emphasis added).

The "short-range order" of these disordered materials are further explained by Ovshinsky in *The Chemical Basis of Amorphicity: Structure and Function*, 26:8–9 Rev. Roum. Phys. at 893–903 (1981):

[S]hort-range order is not conserved . . . Indeed, when crystalline symmetry is destroyed, it becomes impossible to retain the same short-range order. The reason for this is that the short-range order is controlled by the force fields of the electron orbitals therefore the environment must be fundamentally different in corresponding crystalline and amorphous solids. In other words, it is the interaction of the local chemical bonds with their surrounding environment which determines the electrical, chemical, and physical properties of the material, and these can never be the same in amorphous materials as they are in crystalline materials . . . The orbital relationships that can exist in three-dimensional space in amorphous but not crystalline materials are the basis for new geometries, many of which are inherently anti-crystalline in nature. Distortion of bonds and displacement of atoms can be an adequate reason to cause amorphicity in single component materials. But to sufficiently understand the amorphicity, one must understand the three-dimensional relationships inherent in the amorphous state, for it is they which generate internal topology incompatible with the translational symmetry of the crystalline lattice . . . What is important in the amorphous state is the fact that one can make an infinity of materials that do not have any crystalline counterparts, and that even the ones that do are similar primarily in chemical composition. The spatial and energetic relationships of these atoms can be entirely different in the amorphous and crystalline forms, even though their chemical elements can be the same . . .

Short-range, or local, order is elaborated on in U.S. Pat. No. 4,520,039 to Ovshinsky, entitled *Compositionally Varied Materials and Method for Synthesizing the Materials*, the contents of which are incorporated by reference. This patent discusses how disordered materials do not require any periodic local order and how, by using Ovshinsky's techniques, spatial and orientational placement of similar or dissimilar atoms or groups of atoms is possible with such increased precision and control of the local configurations that it is possible to produce qualitatively new phenomena. In addition, this patent discusses that the atoms used need not be restricted to "d band" or "f band" atoms, but can be any atom in which the controlled aspects of the interaction with the local environment plays a significant role physically, electrically, or chemically so as to affect the physical properties and hence the functions of the materials. These techniques result in means of synthesizing new materials which are disordered in several different senses simultaneously.

By forming metal hydride alloys from such disordered materials, Ovshinsky and his team were able to greatly increase the reversible hydrogen storage characteristics required for efficient and economical battery applications, and produce, for the first time, commercially viable batteries having high density energy storage, efficient reversibility, high electrical efficiency, bulk hydrogen storage without structural change or poisoning, long cycle life, and deep discharge capability.

The improved characteristics of these alloys result from tailoring the local chemical order and hence the local structural order by the incorporation of selected modifier elements into a host matrix. Disordered metal hydride alloys have a substantially increased density of catalytically active sites and storage sites compared to conventional ordered materials. These additional sites are responsible for improved efficiency of electrochemical charging/discharging and an increase in electrical energy storage capacity. The nature and number of storage sites can even be designed independently of the catalytically active sites. More specifically, these disordered multi-component alloys are thermodynamically tailored to allow storage of hydrogen atoms at a wide range of modulated bonding strengths within the range of reversibility suitable for use in secondary battery applications.

Based on these principles of disordered materials, described above, a family of extremely efficient electrochemical hydrogen storage materials were formulated. These are the Ti—V—Zr—Ni type active materials such as disclosed by Ovshinsky's team in U.S. Pat. No. 4,551,400 ("the '400 Patent"), the disclosure of which is incorporated by reference. These materials reversibly form hydrides in order to store hydrogen. All the materials used in the '400 Patent utilize a Ti—V—Ni composition, where at least Ti, V, and Ni are present with at least one or more of Cr, Zr, and Al. The materials of the '400 Patent are generally multiphase polycrystalline materials, which may contain, but are not limited to, one or more phases of Ti—V—Zr—Ni material with $C_{14}$ and $C_{15}$ type crystal structures. Other Ti—V—Zr—Ni alloys may also be used for fabricating rechargeable hydrogen storage negative electrodes. One such family of materials are those described in U.S. Pat. No. 4,728,586 ("the '586 Patent"), titled *Enhanced Charge Retention Electrochemical Hydrogen Storage Alloys and an Enhanced Charge Retention Electrochemical Cell*, the disclosure of which is incorporated by reference.

The characteristic surface roughness of the metal electrolyte interface is a result of the disordered nature of the material. Since all of the constituent elements, as well as many alloys and phases of them, are present throughout the metal, they are also represented at the surfaces and at cracks which form in the metal/electrolyte interface. Thus, the characteristic surface roughness is descriptive of the interaction of the physical and chemical properties of the host metals as well as of the alloys and crystallographic phases of the alloys, in an alkaline environment. The microscopic chemical, physical, and crystallographic parameters of the individual phases within the hydrogen storage alloy material are believed to be important in determining its macroscopic electrochemical characteristics.

In addition to the physical nature of its roughened surface, it has been observed that V—Ti—Zr—Ni alloys tend to reach a steady state surface condition and particle size. This steady state surface condition is characterized by a relatively high concentration of metallic nickel. These observations are consistent with a relatively high rate of removal through precipitation of the oxides of titanium and zirconium from the surface and a much lower rate of nickel solubilization. The resultant surface seems to have a higher concentration of nickel than would be expected from the bulk composition of the negative hydrogen storage electrode. Nickel in the metallic state is electrically conductive and catalytic, imparting these properties to the surface. As a result, the surface of the negative hydrogen storage electrode is more catalytic and conductive than if the surface contained a higher concentration of insulating oxides.

The surface of the negative electrode, which has a conductive and catalytic component —the metallic nickel— appears to interact with chromium alloys in catalyzing various hydride and dehydride reaction steps. To a large extent, many electrode processes, including competing electrode processes, are controlled by the presence of chromium in the hydrogen storage alloy material, as disclosed in the '586 Patent.

Rechargeable alkaline cells can be either vented cells or sealed cells. During normal operation, a vented cell typically permits venting of gas to relieve excess pressure as part of the normal operating behavior. In contrast, a sealed cell generally does not permit venting on a regular basis. As a result of this difference, the vent assemblies and the amounts of electrolyte in the cell container relative to the electrode geometry both differ significantly.

Vented cells operate in a "flooded condition." The term "flooded condition" means that the electrodes are completely immersed in, covered by, and wetted by the electrolyte. Thus, such cells are sometimes referred to as "flooded cells." A vented cell is typically designed for very low operating pressures of only a few pounds per square inch after which excess pressures are relieved by a vent mechanism.

In contrast, sealed cells are designed to operate in a "starved" electrolyte configuration, that is with only the minimum amount of electrolyte necessary to permit gas recombination. The enclosure for a sealed cell is normally metallic and the cell may be designed for operation at up to about 100 p.s.i. absolute or higher. Because they are sealed, such cells do not require periodic maintenance.

Typically, a sealed rechargeable alkaline cell for use in consumer appliances, such as a C cell, uses a cylindrical nickel-plated steel case as the negative terminal and the cell cover as the positive terminal. An insulator separates the positive cover from the negative cell can. The electrodes are wound to form a compact "jelly roll" with the electrodes of opposite polarity isolated from each other by a porous, woven or non-woven separator of nylon or polypropylene, for example. A tab extends from each electrode to create a single current path through which current is distributed to the entire electrode area during charging and discharging. The tab on each electrode is electrically connected to its respective terminal.

In sealed cells, the discharge capacity of a nickel based positive electrode is limited by the amount of electrolyte, the amount of active material, and the charging efficiencies. The charge capacities of a NiCd negative electrode and a Ni—MH negative electrode are both provided in excess, to maintain the optimum capacity and provide overcharge protection.

The operational lifespan, that is, the available number of charge and discharge cycles of a sealed cell, typically determines the kinds of applications for which a cell will be useful. Cells that are capable of undergoing more cycles have more potential applications. Thus, longer lifespan cells are more desirable.

An additional goal in making any type of electrode is to obtain as high an energy density as possible. A high energy density nickel hydroxide electrode provides for improved gravimetric energy density in nickel batteries, especially nickel-metal hydride batteries. It also provides for lower battery cost by reducing the amount of nickel hydroxide materials required and thus significantly lowering the materials cost.

Cobalt has also long been used as an additive to nickel hydroxide electrode materials. Cobalt is usually added to nickel hydroxide at a level of 0–5% in commercial applications. This level of cobalt is used to improve the speed of activation, increase resistance to poisons, and marginally improve capacity. It is generally believed that the major reason cobalt is effective in these areas is through an increase in conductivity within the nickel hydroxide matrix.

On the other hand, Zn and Cd are added to nickel hydroxide to improve cycle life and high temperature operation. The mechanism for these improvements is thought to be related to two functions. Cycle life is extended by decreasing swelling brought on by density changes between the oxidized and reduced states of the nickel hydroxide. Cd and Zn incorporated into the nickel hydroxide reduce the swelling by reducing the difference in density in the charged and discharged condition and increasing the mechanical stability of the nickel hydroxide itself. The exact mechanism is not quite clear, but may be related to improving the ductility of the nickel hydroxide to minimize disintegration and surface area formation. Cd and Zn improve high temperature operation by raising the oxygen overvoltage such that charging efficiency at high temperature is increased, thereby preventing the premature evolution of oxygen that typically occurs from standard nickel hydroxides at high temperature.

Prior art modifications to nickel hydroxide by Co, Zn, and Cd do not address the special requirements of Ni—MH batteries, particularly when Ni—MH batteries are used in electric vehicles. Because Ni—MH negative electrodes have an extremely high storage capacity, the nickel hydroxide positive electrode material is essentially the limiting factor in the overall battery energy density. This makes extending the performance of the nickel hydroxide in all areas more important than in the past.

The prior art teaches the use of 0–10% cobalt coprecipitated additives to improve capacity and utilization. With the use of up to 10% cobalt as described in the prior art, the utilization can be improved to only about 100% of the theoretical one-electron capacity (capacity equivalent to one electron transferred for each nickel atom). The prior art additionally teaches combinations of cobalt and zinc or cadmium additives typically in the proportions of 0–5% each. These additives provide useful benefits in terms of cycle life and high temperature performance. However, they do not provide for utilizations in excess of the one-electron capacity. In fact, they tend to stabilize the capacity at lower levels. The use of radically higher cobalt levels (20% and more) and special methods of preparation such as exemplified by Delmas are scientifically interesting. However, these materials, described as crystalline as opposed to the disordered materials in the present invention, are impractical due to the high cost of cobalt and do not provide stable capacities in excess of the one-electron theoretical capacities.

SUMMARY OF THE INVENTION

One objective of the present invention is a nickel metal hydride battery capable of improved capacity and performance at a reduced cost.

These and other objectives of the present invention are satisfied by a disordered positive electrode for use in an alkaline rechargeable electrochemical cell comprising: a solid solution nickel aluminum hydroxide material having a multiphase structure. This nickel aluminum hydroxide material is a multiphase α-phase material that comprises at least one structure chosen from the group consisting of amorphous, microcrystalline, and polycrystalline.

Embodiments of the present invention include the solid solution nickel aluminum hydroxide material described above formed from nickel aluminum hydroxide and cobalt hydroxide that can further comprise at least one phase stabilizer, at least one conductivity enhancer, and at least one performance enhancer. The at least one phase stabilizer is chosen from the group consisting of Al, Ba, Fe, K, Li, and Mn. The at least one conductivity enhancer is any metal, or metallic compound, or preferably chosen from the group consisting of Ag, CoOOH, Co, Cu, and Ni. The at least one performance enhancer that is chosen from the group consisting of transition metal elements, F, and Mg. Preferably the at least one performance enhancer is chosen from the group consisting of Ag, Co, F, Fe, Mg, Mn, and Zn.

Also described is a method of forming a high capacity, long cycle life disordered positive electrode material for use in an alkaline rechargeable electrochemical cell comprising the step of: sequentially precipitating nickel aluminum hydroxide and Co(OH)$_2$.

DETAILED DESCRIPTION OF THE INVENTION

Wile investigating the multiphase disordered materials of the present invention, originally described in U.S. patent application Ser. No. 08/027,973 (the contents of which are incorporated by reference), it was discovered, quite unexpectedly, that efficient multiphase disordered materials could also be formulated using nickel aluminum hydroxide as the main constituent of the material rather than nickel hydroxide. Such materials have the added advantage that they exist as stable α-phase materials from the onset of their formulation. This means that such materials are α-phase materials that are prepared in situ, and require no precharge or any other kind of treatment in order to transform them into a stabilized form. As described in the parents of the present application, α-phase materials have more stable capacity and yield a stable high utilization in excess of their theoretical one-electron capacity.

The transformation of nickel hydroxide materials into nickel oxy-hydroxide materials can be described by the following equation:

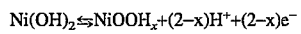

In prior art nickel hydroxide materials, x=1, thus only a single electron is transferred per nickel atom. In the materials of the present invention, x<1, and thus more than one electron can be transferred per nickel atom. Preferably, $0<x\leq0.8$ which means that 1.2 to 2.0 electrons are transferred per nickel atom.

The improved capacity of the present materials relates to their multiphase disordered structure, improved stability, and increased conductivity. While these characteristics are discussed separately, it is believed that they are all interrelated such that improvements, for example, in stability lead to improvements in conductivity.

In prior art nickel hydroxide materials, cobalt was added to improve stability and encourage multiple electron transfer. In such material, fractionally more than one electrode is theoretically transferred. However, as discussed in U.S. Pat. No. 5,348,822, this effect is short lived.

The present invention involves a unique 60-phase positive nickel electrode material that is produced in situ as stable α-phase material. The advantages of such in situ production are significant. The cycle life of these cells is considerably increased. The cost of producing this material as well as the time required for producing it are both significantly reduced, as well.

The stabilized α-phase materials of the present invention are multiphase materials that, like other Ovonic negative and positive electrode battery materials have phases that each contribute a distinct portion of the overall performance features of the electrode material. For example, some phases are responsible for stabilizing the material, other catalyze a variety of chemical reactions, and still others improve electron conductivity. The multiphase materials of the present invention can have an amorphous, microcrystalline, or polycrystalline structure, and/or combinations of amorphous, microcrystalline, or polycrystalline structures.

The present materials are simple to prepare, which also reduces the cost of producing them. In one embodiment, the materials of the present invention are prepared by first preparing a slurry of nickel aluminum hydroxide and then separately preparing a slurry of Co(OH)$_2$. These two slurries are then combined at a ratio of 80–95 wt % nickel aluminum hydroxide slurry and 5–20 wt % Co(OH)$_2$ slurry. Another method of preparing these materials is to sequentially precipitate nickel aluminum hydroxide followed by cobalt hydroxide. The product is spherical nickel aluminum hydroxide particles from 1–10 microns in size. Positive electrodes are formed from the materials of the present invention by pasting these materials using conventional pasting techniques on a nickel foam or a nickel fiber substrate.

To further enhance the stability of the materials of the present invention, stabilizer elements, such as at least one element chosen from the group consisting of Al, Ba, Fe, K, Li, and Mn, can be added.

To further enhance the conductivity of the materials of the present invention, any metal or metallic compound, preferably, at least one element chosen from the group consisting of Ag, Co, Ni, and Cu, as well as CoOOH, can be added to the material. Such conductivity enhancer(s) can be added in such a manner and in sufficient quantities to produce a uniform surface coating of the nickel aluminum hydroxide spherical particles.

Additional performance enhancers may be added to improve specific performance characteristics of the cell fabricated with positive electrode materials of the present invention, such as, the high temperature performance, charging efficiency, capacity, and self discharge rate. Such performance enhancers are chosen from the transition metal elements or preferably from the group consisting of Ag, Co, F, Fe, Mg, Mn, and Zn.

Preferably, if it is desired that the materials have enhanced internal conductivity, the conductivity enhancer(s) should be added during the fabrication of the nickel aluminum hydroxide particles.

Without wishing to be bound by theory, it is believed that the extremely stable α-phase structure of the nickel aluminum hydroxide materials of the present invention result from the fact that these materials are not hydrated structures in the sense that conventional α-phase nickel hydroxide materials are. It is well known in the art that the migration of water molecules in nickel hydroxide materials plays a significant role in the irksome expansion and contraction of the nickel hydroxide structure with cycling. Because a similar phenomenon does not occur in the present materials, the structure remains stable and positive electrodes constructed with them do not swell and contract significantly during cycling.

The efficiency of the present invention was demonstrated by the inventors with their early embodiments. For example, an early formulation of nickel aluminum hydroxide plus Co and CoO yielded only 780 C./g in tri-electrode cells. By comparison, spherical nickel hydroxide materials typically yielded typically yield about 850 C./g in half cells. In sharp contrast, materials of the present invention formulated using a 90 wt % nickel aluminum hydroxide slurry and a 10 wt % $Co(OH)_2$ slurry yielded 950 C./g tri-electrode cells.

The positive electrode material described in U.S. Pat. No. 5,344,728 is a disordered active material consisting of a 10% coprecipitated cobalt active material with layers of enriched cobalt substituted on the electrode surface. This material contains a nominal percentage of stabilized α/γ-phase material as a result of its disordered microstructure.

Building on this work with disordered nickel hydroxide materials, the inventors of the present invention found that predominantly α-phase nickel hydroxide materials that are multiphased could be produced using a nickel aluminum hydroxide base rather than nickel hydroxide materials. These nickel aluminum hydroxide materials generally have the formula $Ni_xAl_{1-x}(OH)_2$ where $0.75<x<0.98$, preferable $x=0.90$. The materials of the present invention are disordered materials that are capable of transferring from 1.2–2.0 electrons per nickel atom. The disordered materials of the present invention are multiphase materials having at least one α-phase and containing at least one structure chosen from the group consisting of amorphous, microcrystalline, and polycrystalline.

The choice of disordered materials has fundamental scientific advantages: as seen, a substantial number of elements can be included in the lists of modifiers. These elements offer a variety of bonding possibilities due to the multidirectionality of d-orbitals. The multidirectionality of d-orbitals provides for a tremendous increase in density. A considerable increase in electron transfer capacity is possible in the disordered materials of the present invention compared to crystalline structures such as described by Delmas. The preparation of disordered materials produces large numbers of grain boundaries and a large surface area leading to the increased conductivity and hydrogen diffusion, and subsequently, multiple electron transfer of the materials of the present invention. Thus, in addition to compositional disorder, there occurs topological disorder at phase boundaries of the multi-phase materials. This increases enormously the density of catalytic sites.

Additional improvement of the disordered material of the present invention are possible when these disordered materials are combined with electrolytes where the electrolyte comprises at least one element chosen from the group consisting of Ba, Ca, Cs, K, Na, Rb, and Sr, combined with at least one member of the group consisting of Br, Cl, F, OH. Particular examples of such electrolytes are formulations of KOH and CsF and KOH and CsOH.

The material of the present invention has been observed to transfer up to 1.5 electrons per atom during reversible cycling. Cycling tests currently underway indicate that multiple electron transfers remain stable throughout the life of the cell. Thus, it is expected that cells fabricated using the materials of the present invention would exhibit excellent capacity and extended cycle lives over previously described materials.

EXAMPLE

Ni—MH negative electrodes were prepared as described in copending U.S. patent application Ser. No. 08/027,973 from negative electrode materials having the formula

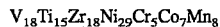

$V_{18}Ti_{15}Zr_{18}Ni_{29}Cr_5Co_7Mn_8$

Nickel aluminum hydroxide materials designated N-1, N-2, N-3, and N-4, were fabricated according to the present invention by pasting $Ni_{0.90}Al_{0.10})(OH)_2$ on nickle foam. The resulting positive electrodes were calendared to 0.017 in, formed, and cycled at C/10 in trielectrode cells.

Nickel aluminum hydroxide materials designated NC-1, NC-2, NC-3, and NC-4 were formulated by sequentially precipitating $(Ni_{90}Al_{10})(OH)_2$ and $Co(OH)_2$. The resulting filter cake was washed with NaOH and deionized water until nearly neutral. The filter cake was screened so that the spherical particles were ≦75 microns in size. This material was pasted on nickel foam and added. The resulting positive electrodes were calendared to 0.017 in, formed, and cycled at C/10 in tri-electrode cells.

A comparison cell designated C-1 was fabricated in an identical manner to the embodiments of the present invention except that standard spherical nickel hydroxide material (Tanaka) was used.

The results are shown in Table 1.

TABLE 1

| cell type | peak capacity (mAh/g) | e⁻transferred/nickel atom |
| --- | --- | --- |
| N-1 | 201 | 1.029 |
| N-2 | 205 | 1.049 |
| N-3 | 226 | 1.156 |
| N-4 | 228 | 1.164 |

TABLE 1-continued

| cell type | peak capacity (mAh/g) | e⁻ transferred/nickel atom |
|---|---|---|
| NC-1 | 218 | 1.255 |
| NC-2 | 223 | 1.284 |
| NC-3 | 235 | 1.349 |
| NC-4 | 236 | 1.359 |
| C-1 | 210 | 1.0 |

The discussion, descriptions, and example of this specification are merely illustrative of particular embodiments of the invention and are not meant as limitations upon its practice. In particular, Ni—Cd and Ni—MH cells are specifically discussed, however, the positive electrodes of the present invention can be used with any Ni based negative cell, such as NiZn and NiFe. Thus, it is the following claims, including all equivalents, that define the scope of the invention.

What is claimed is:

1. A disorder positive electrode for use in an alkaline rechargable electrochemical cell comprising:
   a bulk modified nickel aluminum hydroxide material that comprises:
   a stable multiphased α-phase material where at least one phase of said stable multiphased material comprises a structure chosen from the group consisting of amorphous, microcyrstalline, and polycrystalline.

2. The disordered positive electrode claimed in claim 1, where said bulk modified nickel hydroxide material comprises:
   a stable multiphased α-phase material where at least one phase of said stable multiphased material comprises a microcrystalline structure.

3. A disordered positive electrode for use in an alkaline rechargable electrochemical cell comprising:
   a bulk modified nickle aluminum hydroxide material having a multiphase structure and at least one of the following additional components:
   at least one phase stabilizer,
   at least one conductivity enhancer, and
   at least one performance enhancer.

4. The disordered positive electrode claimed in claim 3, where said at least one phase stabilizer is chosen from the group consisting of Al, Ba, Fe, K, Li, and Mn.

5. The disordered positive electrode claimed in claim 4, where said at least one phase stabilizer is Al.

6. The disordered positive electrode claimed in claim 3, where said at least one conductivity enhancer is at least one metal or metallic compound.

7. The disordered positive electrode claimed in claim 3, where said at least one conductivity enhancer is chosen from the group consisting of Ag, CoOOH, Co, Cu, and Ni.

8. The disordered positive electrode claimed in claim 3, where said at least one performance enhancer is at least one element chosen from the group consisting of the transition metal element.

9. The positive disordered electrode claimed in claim 3, where said at least one performance enhancer is chosen from the group consisting of Ag, Co, F, Fe, Mg, Mn, and Zn.

10. The disordered positive electrode claimed in claim 2, where said solid solution nickle aluminum hydroxide material comprises 85–95 wt % nickle aluminum hydroxide and 5–15 wt % $Co(OH)_2$.

11. A method of forming a high capacity, long cycle life disordered positive electrode material for use in an alkaline rechargeable electrochemical cell comprising the step of:
    sequentially precipitating nickel aluminum hydroxide and $Co(OH)_2$ to form a stable multiphase α-phased material.

12. The method of forming a positive electrode as claimed in claim 11, further comprising the step of:
    adding to said sequentially precipitated material, at least one of the following additional components:
    at least one phase stabilizer,
    at least one conductivity enhancer, and
    at least one performance enchancer.

13. The method of forming a positive electrode as claimed in claim 12, where said at least one phase stablizer is chosen from the group consisting of Al, Ba, Fe, K, Li, and Mn.

14. The method of forming a positive electrode as claimed in claim 12, where said at least one conductivity enchancer is chosen from the group consisting of Ag, CoOOH, Co, Cu, and Ni.

15. The method of forming a positive electrode as claimed in claim 12, wherein said at least one performance enhancer is chosen from the group consisting of Ag, Co, F, Fe, Mg, Mn, and Zn.

16. The method of forming a positive electrode as claimed in claim 12, where said nickle aluminum hydroxide material has the following formula:

$$Ni_xAl_{1-x}(OH)_2$$

where $0.75 \leq x \leq 0.98$.

17. A method of forming a disordered positive electrode for use in an alkaline rechargeable electrochemical cell comprising the steps of:
    forming a slurry containing nickle aluminum hydroxide;
    forming a slurry containing $Co(OH)_2$;
    combining said slurry containing nickel aluminum hydroxide with said slurry containing $Co(OH)_2$;
    drying said mixture.

* * * * *